United States Patent [19]

Bonneau et al.

[11] Patent Number: 5,529,969
[45] Date of Patent: Jun. 25, 1996

[54] B.E.T. SPECIFIC SURFACE-STABILIZED CERIA

[75] Inventors: Lionel Bonneau, Angliers; Thierry Chopin, Saint Denis; Olivier Touret, Aubervilliers, all of France

[73] Assignee: Rhone-Poulenc Chimie, Courbevoie, France

[21] Appl. No.: 987,777

[22] Filed: Dec. 9, 1992

[30] Foreign Application Priority Data

Dec. 9, 1991 [FR] France ................... 91 15210

[51] Int. Cl.⁶ ............... B01J 21/08; B01J 23/10; B01J 35/10; B01J 37/03
[52] U.S. Cl. ............ 502/263; 502/235; 502/439
[58] Field of Search ................. 502/263, 304, 502/439, 235

[56] References Cited

U.S. PATENT DOCUMENTS

| | | | |
|---|---|---|---|
| 4,663,137 | 5/1987 | Chane-Ching et al. | 502/304 X |
| 4,940,685 | 7/1990 | Sauvion et al. | 502/263 |
| 5,017,352 | 5/1991 | Chane-Ching et al. | 502/304 X |
| 5,064,803 | 11/1991 | Nunan | 502/304 X |
| 5,080,877 | 1/1992 | Chane-Ching et al. | 502/304 X |

FOREIGN PATENT DOCUMENTS

| | | |
|---|---|---|
| 0184506A1 | 6/1986 | European Pat. Off. |
| 0207857A3 | 1/1987 | European Pat. Off. |
| 0388567A1 | 9/1990 | European Pat. Off. |

*Primary Examiner*—Paul Lieberman
*Assistant Examiner*—Douglas McGinty
*Attorney, Agent, or Firm*—Burns, Doane, Swecker & Mathis

[57] ABSTRACT

Ceric oxide (ceria) particulates exhibiting a particularly small crystallite size, well suited for catalyst/catalyst carrier applications, include a specific surface-stabilizing amount of silicon values (preferably less than 1% by weight thereof, expressed as $SiO_2$) and have a specific surface of at least 40 $m^2/g$ after calcination at 800° C. for 6 hours and of at least 20 $m^2/g$ after calcination at 1,000° C. for 6 hours; such $CeO_2$ particulates are advantageously prepared by (a) suspending certain ceric hydroxides in a basic aqueous reaction medium containing a silicon compound, (b) autoclaving the resulting suspension, (c) cooling and depressurizing such medium of reaction, (d) separating a ceric hydroxide therefrom, and (e) calcining the ceric hydroxide thus separated.

39 Claims, No Drawings

B.E.T. SPECIFIC SURFACE-STABILIZED CERIA

BACKGROUND OF THE INVENTION

1. Field of the Invention

The present invention relates to novel compositions based on ceric oxide, and, more especially, to novel compositions based on ceric oxide and comprising stabilizing amounts of silicon values, and which have high specific surfaces at high temperatures.

This invention also relates to a process for the preparation of such compositions and to the use of same, particularly in the field of catalysis.

As utilized herein, by the term "specific surface" is intended the B.E.T. specific surface area determined by nitrogen adsorption in conformity with ASTM standard D 3663-78 established from the BRUNAUER/EMMETT/TELLER technique described in the *Journal of the American Chemical Society*, volume 60, 309 (1938). The specific surfaces reported are measured on products which have been subjected to a calcination operation at the temperature and for the period of time indicated.

Moreover, the phrases "composition based on ceric oxide containing silicon," "ceric oxide stabilized by silicon," or, more simply, "stabilized ceric oxide" are used interchangeably herein, to specify the same final product.

2. Description of the Prior Art:

It is known to this art that ceric oxide may be used as a catalyst or catalyst support. Compare the research of Paul Meriaudeau et al, relating to the synthesis of methanol from $CO+H_2$ over catalysts of platinum deposited on ceric oxide, reported at *CR. Acad. Sc. Paris*, t. 297, Series II—471 (1983).

It is also well known to this art that the efficiency of a catalyst is generally greater, the greater the contact surface between the catalyst and the reactants. To achieve this, it is necessary to maintain the catalyst in the most finely divided state possible, namely, the solid particles comprising same must be as small and as separate as possible. The fundamental role of the support is therefore to maintain the catalyst particles or crystallites in contact with the reactants, in the most finely divided state possible.

However, during prolonged use of a catalyst support, a decrease in its specific surface occurs, which may be caused either by the coalescence of the very fine micropores, or by growth of the crystallites thereof. During such coalescence, an amount of the catalyst becomes absorbed into the mass of the support and thus is no longer available for contact with the reactants.

This is the case with most of the ceric oxides to date known to this art, which have a specific surface which rapidly decreases at operational temperatures in excess of 500° C.

Thus, R. Alvero et al, *J. Chem. Soc., Dalton Trans*, 87 (1984) have obtained from ceric ammonium nitrate a ceric oxide having, after calcination at a temperature of 600° C., a specific surface of only 29 $m^2/g$.

FR-A-2,559,754 describes a ceric oxide having a specific surface of at least 85±5 $m^2/g$, measured after calcination at a temperature ranging from 350° to 450° C. and, preferably, ranging from 100 to 130 $m^2/g$ after calcination at a temperature of from 400° to 450° C. Said oxide is prepared by hydrolysis of an aqueous ceric nitrate solution in a nitric acid medium, followed by separation of the resulting precipitate, washing with an organic solvent, optional drying, and then calcination. The ceric oxide produced has a specific surface which is of value when it is used in the calcination temperature range of from 300° to 600° C. However, a decrease in the specific surface after calcination at a higher temperature is observed, this specific surface being 10 $m^2/g$, after calcination at 800° C.

Also compare FR-A-2,559,755, which relates to a ceric oxide having a specific surface of at least 85±5 $m^2/g$ after calcination at a temperature of from 350° to 500° C., and preferably ranging from 150 to 180 $m^2/g$ after calcination at a temperature of from 400° to 450° C. This oxide is obtained via a process which entails precipitating a basic ceric sulfate by reacting an aqueous ceric nitrate solution with an aqueous solution containing sulfate ions, separating the resulting precipitate, washing it with an ammonia solution, optionally drying it, and then calcining it at a temperature ranging from 300° to 500° C. The ceric oxide thus prepared has a high specific surface, but when it is subjected to a calcination operation at 800° C., its specific surface considerably decreases, to a value on the order of 10 $m^2/g$.

In order to improve the stabilization of the specific surface of ceric oxides at high temperatures, EP-A-207,857, assigned to the assignee hereof, describes the utilization of various stabilization agents therefor, and more particularly silicon oxide. This additive (or dopant/doping agent) may be introduced either by impregnation of a presynthesized ceric oxide or during the manufacturing of the ceric oxide itself. In this latter case, a precursor of silicon oxide is introduced into a sol of a cerium IV compound, the resulting mixture is precipitated by addition of a base, and the precipitate recovered is then calcined.

Although the stabilized ceric oxides thus obtained have, as regards their specific surface, a substantially improved temperature behavior when compared with products devoid of the silicon addition, such behavior remains apparently insufficient as, for a 6-hour calcination at 800° C., the best product obtained has a specific surface of only 36 $m^2/g$; moreover, if heated to 1,000° C., the products experience a decrease in their specific surface to less than 10 $m^2/g$. Too, also per EP-A-207,857, it is indicated that, to attain acceptable stabilization, quantities on the order of 2.5% by weight of $SiO_2$ must be used. However, in such amounts, the presence of silicon within the ceric oxide presents a problem for certain catalytic applications (poisoning by reason of the silicon).

SUMMARY OF THE INVENTION

Accordingly, a major object of the present invention is the provision of improvedly silicon-stabilized ceric oxides which retain large specific surface areas even after calcination at high temperatures, and more particularly at at least 800° C., and which otherwise avoid or conspicuously ameliorate the above advantages and drawbacks to date characterizing the state of this art.

Another object of this invention is the provision of improvedly stabilized ceric oxides containing minimal stabilizing amounts of silicon values.

Still another object of this invention is the provision of a unique synthesis for the production of such improvedly silicon-stabilized ceric oxides.

Briefly, the present invention features novel compositions based on ceric oxide and containing stabilizing amounts of silicon, said compositions having a specific surface area of at least 40 m²/g measured after calcination for 6 hours at 800° C.

DETAILED DESCRIPTION OF THE PREFERRED EMBODIMENTS OF THE INVENTION

More particularly according to the present invention, one of the essential characteristics of the silicon-stabilized ceric oxide is that it has a very large specific surface after calcination at high temperature.

It thus preferably has a specific surface of at least 50 m²/g, and more preferably of at least 60 m²/g, measured after calcination at a temperature of 800° C. for 6 hours.

The most advantageous ceric oxides according to the invention have a specific surface of at least 70 m²/g, and more particularly of at least 80 m²/g, measured after calcination at 800° C. for 6 hours; such specific surface, however, typically does not exceed 100 m²/g.

Moreover, when the ceric oxides according to the invention are subjected to even higher calcination temperatures, for example during their use in catalysis, they exhibit the remarkable property of preserving a specific surface which remains very large; thus, heated to 1,000° C. for 6 hours, the ceric oxides of this invention still have a specific surface of at least 20 m²/g, generally of at least 30 m²/g, and preferably of at least 40 m²/g. The specific surface may be at least or even exceed 50 m²/g, without, however, generally exceeding 100 m²/g.

Another characteristic of the compositions based on ceric oxide according to the invention is that the silicon content, expressed as $SiO_2$, advantageously does not exceed 2% by weight relative to the amount of ceric oxide. For instance, the ceric oxide particulates can comprise less than 2% by weight of silicon values, expressed as $SiO_2$.

Preferably, the compositions according to the invention contain less than 1% by weight of silicon, expressed as $SiO_2$, relative to the amount of ceric oxide. For instance, the ceric oxide particulates can comprise from 0.1% to 1% or no greater than 1% by weight of silicon values, expressed as $SiO_2$.

$SiO_2/CeO_2$ weight ratios ranging from approximately 0.001 to 0.01 and more preferably from 0.003 to 0.01, are generally suitable.

X-ray diffraction analysis evidences that the stabilized ceric oxide of the invention has, after calcination at 800° C., a crystalline phase of the $CeO_2$ type having a high degree of crystallization, greater than 90%.

Analysis of the X-ray diffraction spectra also indicates that this product, again after calcination at 800° C., is present in the form of crystallites of small size, their size typically ranging from 100 Å to 200 Å, depending on the silicon content thereof. After calcination at 1,000° C., this size still remains from 130 Å to 450 Å, again depending on the silicon content thereof.

The very small size of the crystallites, and the very low growth of these crystallites with increasing temperature, constitute particularly important advantages for applications in the field of catalysis. This is because they make it possible, on the one hand, to avoid encapsulation, at high temperatures, of precious metals, such as platinum, which impregnate ceric oxide crystallites, and, on the other, to improve the oxygen storage capacity of this oxide. The example given below will demonstrate the excellent thermal behavior of a ceric oxide according to the invention when it is immersed in an aluminum matrix, as is the case in the washcoat type compositions.

The process for the preparation of the compositions based on ceric oxide according to the invention will now be described in detail.

This process is characterized in that it comprises the following stages:

(a) suspending a ceric hydroxide corresponding to the general formula (I):

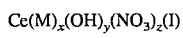

in which M is an alkali metal or a quaternary ammonium radical, x ranges from 0.01 to 0.2, y is such that y=4 −z+x, and z ranges from 0.4 to 0.7, in an aqueous solution containing a decomposable base and a silicon compound;

(b) heating said suspension in a closed vessel to a temperature and to a pressure less than the critical temperature and the critical pressure, respectively, of said suspension (the "autoclaving" stage);

(c) cooling the reaction mixture and releasing it to atmospheric pressure;

(d) separating off the ceric hydroxide thus treated; and (e) calcining said separated ceric hydroxide.

Quite surprisingly, it has now been determined that a ceric oxide, stabilized by silicon, having a very large specific surface even at very high temperatures, can be produced by subjecting a particular ceric hydroxide (or ceric oxide hydrate) to an autoclaving treatment carried out in a basic medium and in the presence of a silicon compound.

A ceric hydroxide corresponding to the above formula (I) is therefore involved in the process of the invention. It is the subject of EP-A-0,208,580, hereby expressly incorporated by reference and relied upon.

More specifically, it is a cerium IV hydroxynitrate which exhibits the property of peptizing, i.e., of yielding a sol by simple dispersion in water.

Differential thermal analysis of said product indicates during the calcination thereof under air atmosphere an exothermic peak of 250° C. to 300° C. for a temperature gradient of 300° C. per hour.

It reveals a $CeO_2$ type crystalline phase having a unit cell of 0.542 nm to 0.544 nm and a degree of crystallization ranging from 30% to 70% and, preferably, from 40% to 60%.

The ceric hydroxide corresponding to the formula (I) having the aforementioned characteristics may be prepared via a process such as described in said EP-A-0,208,580 and which entails providing a colloidal dispersion of a cerium IV compound by reacting an aqueous solution of a cerium IV salt and a base, such as to obtain a neutralization rate less than or equal to 3.0; next subjecting said dispersion to a thermal treatment; and then separating the resulting precipitate therefrom.

Synthesis of the ceric hydroxide of formula (I)

In the first stage of the process described in EP-A-0,208, 580, a colloidal dispersion of a cerium IV compound is prepared. In this dispersion, cerium IV is simultaneously present in the form of ions and of colloids, which reflects that particles of colloidal dimensions are present. This ions/colloids mixture is referred to as a "colloidal dispersion." Such colloidal dispersion is prepared by reacting an aqueous solution of a cerium IV salt with a base in the manner described below.

The cerium IV salt solution may be an aqueous solution of ceric nitrate or an aqueous solution of cerium ammonium nitrate. The solution may contain, without disadvantage, cerium in the cerous state, but it is desirable that it contains at least 85% of cerium IV.

The concentration of the cerium salt solution is not a critical factor and may range from 0.1 to 2 moles/liter, preferably from 1 to 2 moles/liter: the said concentration being expressed in terms of cerium IV. The aqueous cerium IV salt solution generally has a certain initial acidity and may have a normality ranging from 0.1 to 4N and, preferably, from 0.1N to 1N.

The solution of ceric nitrate obtained according to the process of electrolytic oxidation of a cerous nitrate solution and described in FR-A-2,570,087 constitutes a preferred raw material.

As regards the base employed, an aqueous solution of ammonia, of sodium hydroxide or of potassium hydroxide is advantageously used. Gaseous ammonia may also be used. A solution of ammonia is the preferred.

The normality of the basic solution is not a critical factor and may range from 0.1N to 11N, preferably from 0.1N to 5N. The proportion between the basic solution and the cerium IV salt solution must be such that the neutralization rate is greater than or equal to 0.01 and less than or equal to 3.0.

The neutralization rate r is defined by the following equation:

$$\underline{r} = \frac{n3 - n2}{n1}$$

in which n1 represents the number of moles of Ce IV which are present in the final colloidal dispersion; n2 represents the number of moles of OH⁻ required to neutralize the acidity caused by the aqueous solution of cerium IV salt; n3 represents the total number of moles of OH⁻ supplied by adding the base.

The neutralization rate is a reflection of the colloidal state of the cerium IV, i.e., with r=4, cerium IV precipitates in a gelatinous form; with r=0, cerium IV is in the ionic form; and with 0<r<4, cerium IV is the ionic and/or colloidal form.

For a final concentration in cerium IV of less than 0.5 mole/liter, a neutralization rate that is greater than or equal to 0.01 and less than or equal to 2.5 is selected and for a concentration of more than 0.5 mole/liter, it is preferably selected to be greater than or equal to 0.01 and less than or equal to 2.0.

In practice, to attain a required neutralization rate r selected within the interval indicated above for a given concentration in Ce IV in the final colloidal dispersion, the concentration of the basic solution is adjusted such that it satisfies the following equation:

$$[OH^-] = \frac{(n_1 \cdot r + n_2) [Ce\ IV]_f [Ce\ IV]_i}{n_1([Ce\ IV]_i - [Ce\ IV]_f)}$$

in which [OH⁻] represents the concentration in moles/liter of the basic solution; $[Ce\ IV]_f$ represents the concentration in Ce IV in moles/liter of the final colloidal dispersion; $[Ce\ IV]_i$ represents the concentration in Ce IV in moles/liter of the aqueous solution of the cerium IV salt; $n_1$ and $n_2$ are determined by conventional titration of the aqueous cerium IV salt solution, namely, $n_1$ by potentiometric titration by means of a ferrous salt solution and $n_2$ by acid-base titration after complexing cerium using oxalate ions.

The reaction between the aqueous solution of cerium IV salt and the base, employed in the amounts indicated above, is carried out at a temperature which may range from 0° C. to 60° C. but preferably at room temperature, typically 15° to 25° C. The mixing of the aforesaid reactants can be carried out according to any one of a number of different techniques. For example, the aqueous solution of cerium IV salt and the basic solution can be mixed simultaneously by stirring, or the base may be added continuously or in one batch to the aqueous solution of cerium IV salt, or vice versa.

The duration of the mixing operation may range from 0.1 second to 30 hours and preferably from 2 hours to 6 hours.

A colloidal dispersion of a cerium IV compound in an aqueous medium is then obtained in conformity with the process described in EP-A-0,208,580. It has a cerium IV concentration which may range from 0.1 to 2 moles/liter, preferably from 0.3 to 0.8 mole/liter. The percentage of cerium IV in colloidal form generally ranges from 10% to 90% of the cerium IV used.

The mean hydrodynamic diameter of the colloids, determined by quasi-elastic diffusion of light according to the technique described by Michael L. McConnell, in *Analytical Chemistry*, 53, no. 8, 1007 Å (1981), may range from 4 to 30 nm.

Per the process described in EP-A-0,208,580, the dispersion thus obtained is then thermally treated at a temperature ranging from 80° C. to 300° C., preferably from 90° C. to 110° C., and, even more preferably, at the reflux temperature of the reaction mixture.

The conditions of the thermal treatment are not critical; it can be carried out under atmospheric pressure or under a pressure such as, for example, the saturated water vapor pressure corresponding to the thermal treatment temperature. The treatment is carried out under an air atmosphere or under an inert gas atmosphere, preferably under nitrogen.

The duration of this treatment may vary over wide limits, generally from 2 to 48 hours, preferably from 2 to 24 hours.

At the end of the operation, a solid precipitate is recovered, which is separated by the conventional separation techniques: filtration, settling, dewatering and centrifuging.

It is possible to subject the product obtained to a drying operation which may be carried out at a temperature ranging from 15° C. to 120° C., preferably at room temperature, and which may be carried out in air or under reduced pressure, for example ranging from 133.322 Pa to 13332.2 Pa.

Preparation of ceric oxide stabilized according to the invention:

Preferably, the cerium IV hydroxynitrate of formula (I) obtained directly after the above separation and without performing any drying operation thereon, is used in the process of the invention.

According to the process of the invention, the product prepared by hydrolysis of a cerium IV nitrate salt is subjected to a particular autoclaving treatment before carrying out the calcination operation.

To this end, the ceric hydroxide is used in the form of a suspension in an aqueous solution containing a decomposable base and a silicon salt, this solution thus constituting the liquid medium for autoclaving.

It will be appreciated that the manner in which the suspension to be autoclaved is obtained, and in particular the order of introduction of the various reactants comprising same (ceric hydroxide, decomposable base, silicon compound, water), is not critical.

By "decomposable base" is intended a compound having a pk$_b$ lower than 7 and which decomposes under the calcination conditions of the invention.

Exemplary such decomposable bases include ammonia, urea, ammonium acetate, ammonium hydrogen carbonate, ammonium carbonate, or a primary, secondary or tertiary amine such as, for example, methylamine, ethylamine, propylamine, n-butylamine, sec-butylamine, n-pentylamine, 2-aminopentane, 2-amino-2-methylbutane, 1-amino-3-methylbutane, 1,2-diaminoethane, 1,2-diaminopropane, 1,3-diaminopropane, 1,4-diaminobutane, 1,5-diaminopentane, 1,6-diaminohexane, dimethylamine, diethylamine, trimethylamine, triethylamine or a quaternary amine such as, for example, a tetraalkylammonium hydroxide preferably having alkyl radicals containing 1 to 4 carbon atoms. More particularly, tetramethylammonium hydroxide or tetraethylammonium hydroxide is used.

A mixture of bases may also be used.

A solution of ammonia, of tetraalkylammonium hydroxide, or mixtures thereof, is preferably used.

The concentration of the base in the liquid medium destined for autoclaving is not a critical factor according to the invention. It may vary over wide limits, for example from 0.1N to 11N, but it is preferable to use a solution whose concentration ranges from 1 to 10N.

In the liquid medium, the concentration of ceric hydroxide, expressed in terms of $CeO_2$, preferably ranges from 0.1 to 3.0 moles/liter and, even more preferably, from 0.2 to 1.0 mole/liter.

As regards the silicon compounds to be introduced into the reaction medium, there may be used either silicon salts which can be decomposed into oxides by heating, or, directly, submicronic silicon oxide such as that which is present in LUDOX® type silica sols. For instance, the silicon compound can comprise a sol of silica, a siliconate, a quaternary ammonium silicate, or mixture thereof.

Siliconates or quaternary ammonium silicates are exemplary silicon oxide precursor salts. Representative of the siliconates are, more particularly, the alkali metal alkyl siliconates such as, for example, potassium methyl siliconate, a product marketed by RHONE-POULENC under the trademark RHODORSIL®.

The quaternary ammonium ion of the silicates which may be used according to the invention includes hydrocarbon radicals preferably having 1 to 3 carbon atoms.

Thus, it is preferred to employ at least one silicate chosen from among tetramethylammonium silicate, tetraethylammonium silicate, tetrapropylammonium silicate, tetrahydroxyethylammonium silicate (or tetraethanolammonium silicate). Tetramethylammonium silicate is described, in particular, in Y. U. I. Smolin, "Structure of water soluble silicates with complex cations" in *Soluble Silicates*, Edition 1982. Tetraethanolammonium silicate is described, in particular, in Helmut H. Weldes and K. Robert Lange, "Properties of soluble silicates" in *Industrial and Engineering Chemistry*, vol. 61, N4 (Apr. 1969) and in U.S. Pat. No. 3,239,521. The references indicated above also describe other water soluble quaternary ammonium silicates which may be used according to the invention.

The amount of silicon compound or compounds used is such that the weight percentages required in the final composition are provided. As is apparent from the foregoing description, the amounts of silicon compounds to be used generally remain low, such as to provide a calcined and stabilized ceric oxide having a silicon content which advantageously does not exceed 2% by weight, and, even more preferably, 1% by weight.

The second stage of the process according to the invention entails an autoclaving stage.

The autoclaving operation is carried out at a temperature ranging from the reflux temperature to the critical temperature of the reaction mixture. Preferably, a temperature ranging from 100° C. to 350° C., and even more preferably from 150° C. to 350° C., is selected. The increase in temperature is carried out at a rate which is not critical. The reaction temperature is attained, for example, by heating for from 30 minutes to 4 hours.

The process of the invention can be carried out by introducing the ceric hydroxide in suspension in the liquid medium into a closed vessel. The pressure results, therefore, only from the heating of the reaction mixture. Under the temperature conditions indicated above, and in an aqueous medium, the pressure typically ranges from 1 bar ($10^5$ Pa) to 165 bar ($165 \times 10^5$ Pa), preferably from 5 bar ($5 \times 10^5$ Pa) to 165 bar ($165 \times 10^5$ Pa).

It is also possible to exert an external pressure which is then in excess of that produced by heating.

The duration of the autoclaving operation is not critical. It advantageously ranges from 30 minutes to 6 hours.

At the end of the latter operation, the system is permitted to cool by inertia and the system is returned to atmospheric pressure.

The product in suspension in the liquid medium is separated out according to conventional solid/liquid separation techniques such as settling, dewatering, filtration and/or centrifuging.

The product collected may optionally be subjected to washing, preferably with water, and/or to drying under the conditions hereinbefore described.

The present invention also features the ceric hydroxide thus recovered, and prior to calcination.

In a final stage of the process of the invention, the product obtained is calcined at a temperature ranging from 300° C. to 1,000° C.

This temperature is determined as a function of the specific surface desired for the downstream catalytic application, taking account of the fact that the specific surface decreases as the calcination temperature increases.

The duration of the calcination may vary over wide limits, advantageously from 30 minutes to 10 hours and, preferably, from 2 to 6 hours.

In another embodiment of the process of the invention, ceric hydroxide in suspension in a liquid medium is subjected to a first thermal treatment in a closed vessel up to a temperature and a pressure lower than the critical temperature and the critical pressure, respectively, of the liquid medium, or, in other words, to a first autoclaving. Advantageously, the liquid medium is water.

The autoclaved suspension obtained is then subjected to a second autoclaving as described above, namely, with a liquid medium containing a decomposable base and a silicon compound.

The suspension after the first autoclaving may be concentrated or diluted, or the ceric hydroxide thus autoclaved may be separated out and collected, for example by filtration, before being dispersed again in the second autoclaving medium. The precipitate thus recovered may be washed and dried before being redispersed.

The conditions of this first autoclaving are similar to those described for the autoclaving in the basic medium. However, the concentration in ceric hydroxide, expressed in terms of $CeO_2$, may be higher, for example ranging from 0.1 to 4 moles/liter.

The ceric oxide according to the invention has a large specific surface after calcination both at low and at high temperature such that it is very well suited for catalyst applications, whether as catalyst or as catalyst support, in particular in alumina matrix washcoats.

It is particularly suitable for use as a catalyst support in internal combustion engine exhaust gas treatment reactions, i.e., in catalytic converters.

In order to further illustrate the present invention and the advantages thereof, the following specific example is given, it being understood that same is intended only as illustrative and in nowise limitative.

EXAMPLE

1. Synthesis of ceric hydroxide:

Into a 6 liter three-necked flask fitted with a thermometer, a stirring device and a reactant introduction system (metering pump), the following reagents were introduced at room temperature:

(i) 1,000 cm$^3$ of a ceric nitrate solution containing 1.24 moles/liter of cerium IV and having a free acidity of 0.332N; and (ii) 2,555 cm$^3$ of a 0.3726N ammonia solution. The addition of the ammonia solution, at room temperature, to the ceric nitrate solution was carried out at a rate of 1,664 cm$^3$/hour.

An aqueous colloidal dispersion of a cerium IV compound at a concentration, expressed in terms of CeO$_2$, equal to 60 g/l and at a neutralization rate r=0.5, was obtained.

In a second stage, the dispersion obtained was subjected to a thermal treatment in a jacketed reactor, equipped with a coolant and a stirring device, at 100° C. for 4 hours.

After filtering the precipitate, 287 g of yellow product were recovered.

Chemical analysis of the product obtained evidenced the following chemical composition:

(a) Ignition weight loss=20%

(b) CeO$_2$ =80%

(c) Molar ratio NO$_3$–/Ce$^{IV}$=0.49

(d) Molar ratio NH$_4$+/Ce$^{IV}$=0.025

2. Autoclaving of the ceric hydroxide:

A quantity of water suitable for providing an aqueous suspension of 650 ml was added to 287 g of the product prepared previously.

500 ml of an aqueous solution which had been prepared by mixing:

(i) 100 ml of an 11.4N ammonia solution, (ii) potassium methyl siliconate, in an amount such as to provide the desired quantity of SiO$_2$ in the calcined product, and (iii) the necessary complement of water were then introduced into this suspension.

After mixing, the resulting suspension was introduced into a 2 liter autoclave.

The entire unit was then adjusted to 200° C., under approximately 16 bar (16×10$^5$ Pa), for 1 hour, by means of appropriate heating.

At the end of this treatment, the precipitate was filtered on a Büchner funnel. Three fractions of the recovered product were then subjected to a calcination operation, respectively, under the following conditions: 3 hours at 350° C., 6 hours at 800° C. or 6 hours at 1,000° C.

The specific surface area of the ceric oxide obtained (S.S.), for each of these temperatures, was then determined according to the techniques indicated above.

The size of the crystallites perpendicular to 111 directions was also determined by X-ray diffraction (dRX$_{111}$).

The Table below reports the results obtained for five series of tests (Tests 1 to 5) in which the silicon content in the final product was simply varied by changing the amount of potassium methyl siliconate initially introduced into the suspension to be autoclaved.

TABLE

| TEST | SiO$_2$/ CeO$_2$ (% by wt) | S.S. 350° C. (m$^2$/g) | S.S. 800° C. (m$^2$/g) | S.S. 1,000° C. (m$^2$/g) | dRX$_{111}$ (Å) at 800° C. | dRX$_{111}$ (Å) at 1,000° C. |
|---|---|---|---|---|---|---|
| 1 | 0.32 | 275 | 40 | 22 | 200 | 350 |
| 2 | 0.54 | 195 | 63 | 40 | 130 | 200 |
| 3 | 0.94 | 140 | 76 | 52 | 110 | 170 |
| 4 | 1.56 | 120 | 85 | 32 | 100 | 240 |
| 5 | 1.99 | 115 | 85 | 34 | 100 | 250 |

It will be appreciated that the ceric oxide stabilized by silicon according to the invention had a very high specific surface, measured after calcination at 800° C., and that this surface still remained very high even after calcination at 1,000° C.

By comparison, the products obtained according to EP-A-207,857, even though they were stabilized with higher silicon contents, had, on the one hand, a specific surface at 800° C. less than or equal to 36 m$^2$/g and, on the other, a very large decrease in the latter after calcination at 1,000° C., the specific surface decreasing to less than 10 m$^2$/g.

3. Behavior of the ceric oxide in an alumina matrix:

The test below was conducted to evaluate doped ceric oxides according to the invention in an alumina matrix, and more particularly to show the very slight growth in the size of the crystallites within the latter at high temperatures.

3 liters were prepared of an aqueous slurry, containing 30% of dry solids, and a composition by weight as follows (relative to the dry solids):

(i) 80% of an alumina mixture of, by weight, 25% of an alumina gel (VERSAL 250, commercial product of the KAISER company) and of 75% of the same alumina gel after calcination (6 hours at 700°), and (ii) 20% of ceric oxide doped with silicon as prepared in Test 2 above and calcined at 350° C. (SiO$_2$/CeO$_2$ =0.54%).

1% by weight of nitric acid was added to this slurry to peptize the alumina.

The mixture was vigorously stirred, which operation was followed by a wet milling (NECHST milling machine) to reduce the mean size of the particle to about 5 μm.

After milling, the product was dried and then calcined under air. In order to better evaluate the thermal stability of CeO$_2$ in alumina, the temperature and duration of calcination were established, according to the present test, at 1,000° C. for 6 hours.

After calcination, the size of the cerium oxide crystallites in the mixture was measured, and this was accomplished by analysis of the X-ray diffraction spectrum (DEBYE-SCHERRER formula).

The results evidenced that this size was less than 200 Å.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Ceric oxide particulates comprising a specific surface-stabilizing amount of silicon values, said $CeO_2$ particulates having a specific surface of at least 40 m²/g, measured after calcination at 800° C. for 6 hours, said silicon values being present in an amount of less than 2% by weight of said silicon values, expressed as $SiO_2$.

2. The ceric oxide particulates as defined by claim 1, having a specific surface of at least 50 m²/g.

3. The ceric oxide particulates as defined by claim 2, having a specific surface of at least 60 m²/g.

4. The ceric oxide particulates as defined by claim 3, having a specific surface of at least 70 m²/g.

5. The ceric oxide particulates as defined by claim 4, having a specific surface of at least 80 m²/g.

6. The ceric oxide particulates as defined by claim 1, having a degree of crystallization in excess of 90%.

7. The ceric oxide particulates as defined by claim 6, comprising crystallites, the size of which ranging from 100 to 200 Å.

8. The ceric oxide particulates as defined by claim 1, having a specific surface of at least 20 m²/g, measured after calcination at 1,000° C. for 6 hours.

9. The ceric oxide particulates as defined by claim 8, having a specific surface of at least 30 m²/g.

10. The ceric oxide particulates as defined by claim 9, having a specific surface of at least 40 m²/g.

11. The ceric oxide particulates as defined by claim 10, having a specific surface of at least 50 m²/g.

12. The ceric oxide particulates as defined by claim 8, comprising crystallites, the size of which ranging from 130 to 450 Å.

13. The ceric oxide particulates as defined by claim 1, prepared by (a) suspending a ceric hydroxide having the following formula (I):

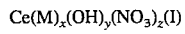
$$Ce(M)_x(OH)_y(NO_3)_z \quad (I)$$

in which M is an alkali metal or a quaternary ammonium radical, x ranges from 0.01 to 0.2, y is such that y=4−z+x, and z ranges from 0.4 to 0.7, in an aqueous solution containing a decomposable base and a silicon compound, (b) thermally treating the resulting suspension at less than the critical temperature and under less than the critical pressure thereof to form a medium of reaction, (c) cooling said medium of reaction and releasing said medium of reaction to atmospheric pressure, (d) separating ceric hydroxide and silicon therefrom, and (e) calcining the ceric hydroxide and silicon thus separated.

14. The ceric oxide particulates as defined by claim 1, comprising no greater than 1% by weight of said silicon values, expressed as $SiO_2$.

15. The ceric oxide particulates as defined by claim 14, comprising from 0.1% to 1% by weight of said silicon values, expressed as $SiO_2$.

16. A process for the preparation of cerie oxide particulates comprising a specific surface-stabilizing amount of silicon values, said $CeO_2$ particulates having a specific surface of at least 40 m²/g measured after calcination at 800° C. for 6 hours, said silicon values being present in an amount of less than 2% by weight of said silicon values, expressed as $SiO_2$, comprising (a) suspending a ceric hydroxide having the following formula (I):

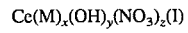
$$Ce(M)_x(OH)_y(NO_3)_z \quad (I)$$

in which M is an alkali metal or a quaternary ammonium radical, x ranges from 0.01 to 0.2, y is such that y=4−z+x, and z ranges from 0.4 to 0.7, in an aqueous solution containing a decomposable base and a silicon compound, (b) thermally treating the resulting suspension at less than the critical temperature and under less than the critical pressure thereof to form a medium of reaction, (c) cooling said medium of reaction and releasing said medium of reaction to atmospheric pressure, (d) separating ceric hydroxide and silicon therefrom, and (e) calcining the ceric hydroxide and silicon thus separated.

17. The process as defined by claim 16, said ceric hydroxide of formula (I) having been prepared by (i) reacting an aqueous solution of a cerium (IV) salt and a base, such as to provide a neutralization rate no greater than 3.0, thereby forming a colloidal dispersion of a cerium (IV) compound, (ii) thermally treating the colloidal dispersion thus formed, and (iii) separating the resulting precipitate therefrom.

18. The process as defined by claim 17, said neutralization rate ranging from 0.01 to 3.0.

19. The process as defined by claim 17, said cerium IV salt comprising ceric nitrate or ceric ammonium nitrate.

20. The process as defined by claim 17, said aqueous solution of a cerium IV salt comprising the product of electrochemical oxidation of an aqueous solution of cerous nitrate.

21. The process as defined by claim 17, the concentration of said aqueous solution of a cerium IV salt ranging from 0.1 to 2 moles per liter, expressed as cerium IV.

22. The process as defined by claim 17, said base comprising an aqueous ammonia solution.

23. The process as defined by claim 17, said basic aqueous solution having a normality ranging from 0.1N to 5N.

24. The process as defined by claim 17, comprising (ii) thermally treating said colloidal dispersion at a temperature ranging from 80° to 300° C.

25. The process as defined by claim 17, comprising (b) autoclaving the resulting suspension in a closed vessel.

26. The process as defined by claim 16, said decomposable base comprising ammonia, urea, ammonium hydrogen carbonate, ammonium carbonate, a primary, secondary, tertiary or quaternary amine, or mixture thereof.

27. The process as defined by claim 26, said decomposable base comprising ammonia, a tetraalkylammonium hydroxide, or mixture thereof.

28. The process as defined by claim 16, the concentration of said decomposable base ranging from 1 to 10N.

29. The process as defined by claim 16, said silicon compound comprising a sol of silica, a siliconate, a quaternary ammonium silicate, or mixture thereof.

30. The process as defined by claim 25, wherein the concentration of ceric hydroxide in the suspension to be autoclaved ranges from 0.1 to 3 moles/liter, expressed as $CeO_2$.

31. The process as defined by claim 30, said concentration ranging from 0.2 to 1.0 mole/liter.

32. The process as defined by claim 25, comprising autoclaving at a temperature ranging from 100° to 350° C.

33. The process as defined by claim 25, comprising autoclaving at a pressure ranging from 1 bar ($10^5$ Pa) to 165 bar ($165 \times 10^5$ Pa).

34. The process as defined by claim 16, comprising (e) calcining at a temperature ranging from 300° to 1,000° C.

35. The ceric hydroxide product of the process as defined by claim 16, obtained after the step (d) thereof.

36. A shaped article comprising the ceric oxide particulates as defined by claim 1.

37. A composition of matter comprising intimate admixture of alumina and the ceric oxide particulates as defined by claim 1.

38. A composition of matter comprising intimate admixture of alumina and the ceric hydroxide as defined by claim 35.

39. A catalyst/catalyst carrier comprising the ceric oxide particulates as defined by claim 1.

\* \* \* \* \*